June 27, 1967  H. W. GOARD ET AL  3,327,492

PROCESS AND APPARATUS FOR CONCENTRATING SOLUTIONS

Filed Sept. 28, 1964  2 Sheets-Sheet 2

INVENTOR.
H. W. GOARD
R. A. WALDO
BY Young & Quigg
ATTORNEYS

United States Patent Office 3,327,492
Patented June 27, 1967

3,327,492
PROCESS AND APPARATUS FOR
CONCENTRATING SOLUTIONS
Howard W. Goard and Richard A. Waldo, Bartlesville,
Okla., assignors to Phillips Petroleum Company, a corporation of Delaware
Filed Sept. 28, 1964, Ser. No. 399,550
12 Claims. (Cl. 62—58)

This invention relates to processes and apparatus for concentrating solutions. In another aspect, it relates to processes and apparatus for separating components of a mixture of liquids having different freezing temperatures by forming a crystal slurry by freezing the mixture, in which slurry the crystals contain all of one component and part of the other component, and then purifying the crystals to substantially one component before melting them in a pulsed crystal purification column, with particular emphasis on the process and apparatus for feeding said crystal slurry to said column. In another aspect, this invention is an improvement in the process and apparatus for feeding a crystal slurry to the process for purification of crystals disclosed in U.S. Patent 2,854,494 of Sept. 30, 1958, to R. W. Thomas.

The prior art operation of such processes as that of the Thomas patent cited is excellent where the internal diameter of the crystal purification column is 2 feet or less. However, when this diameter is increased to about 4 feet, the efficiency of separation tends to be reduced due to a reduction of the separating effect of the pressure pulses caused by pressure being lost back into the large volume of the chiller, which is freezing the slurry.

It has now been found that by interposing a positive-displacement, progressing cavity pump to pump the crystal slurry from the chiller to the pulsed crystal purification column, the power of the pulses is effectively restored and retained in the crystal purification column substantially independent of its diameter. In addition, the recycle of some of the crystal slurry from the outlet to the chiller inlet increases the fluid velocity and turbulence in the chiller, thereby enabling the larger size chiller, or chillers, necessary to feed a large-diameter, pulsed, crystal purification column to provide more uniform crystal size in the slurry, reducing chiller plugging and increasing heat transfer to the entire body of the crystal slurry. This improved chilling process also results in a lower and more uniform load on the scraper motor of the chiller.

One object of this invention is to provide novel and improved processes of and apparatus for feeding a crystal slurry to a pulsed crystal purification column.

Another object is to provide an improved process and system for concentrating solutions or separating components of a mixture of liquids of different freezing points.

Numerous other objects and advantages will be apparent to those skilled in the art upon reading the accompanying specification, claims and drawings.

In the drawings:

FIGURE 1 is an elevational view of a solution concentration system embodying the present invention.

FIGURE 2 is a perspective view with parts broken away to show details of construction of a specific progressing cavity pump invented by T. J. Huddleston, U.S. patent application Ser. No. 399,807, filed Sept. 28, 1964, now U.S. Pat. No. 3,271,081, assigned to Phillips Petroleum Company, assignment recorded Nov. 9, 1964, Reel 1460, Frame 238, which is preferred for use in FIGURE 1, although any progressing cavity pump may be employed in the present invention, such as those of U.S. Patents 2,512,764; 2,028,407; 2,085,115; Re. 21,374; 2,161,374 and 2,189,867.

Purification by means of fractional crystallization has been known for a number of years. Schmidt Re. 23,810 (1954) disclosed a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of nonaqueous mixtures, an example of such an application being the separation of para-xylene from a mixture thereof with the other xylene isomers and ethyl benzene.

For the purpose of illustrating the present invention, a process in which ethyl alcohol in a water solution is concentrated has been chosen. Such a process is useful in making beer or wine concentrates for cheaper shipping and/or for reconstitution with water, or for sale as malt liquor, fortified wines, and the like. However, it should be understood that the same process, without change, will operate to separate to any desired degree any two liquids having different freezing temperatures.

Figure 1:
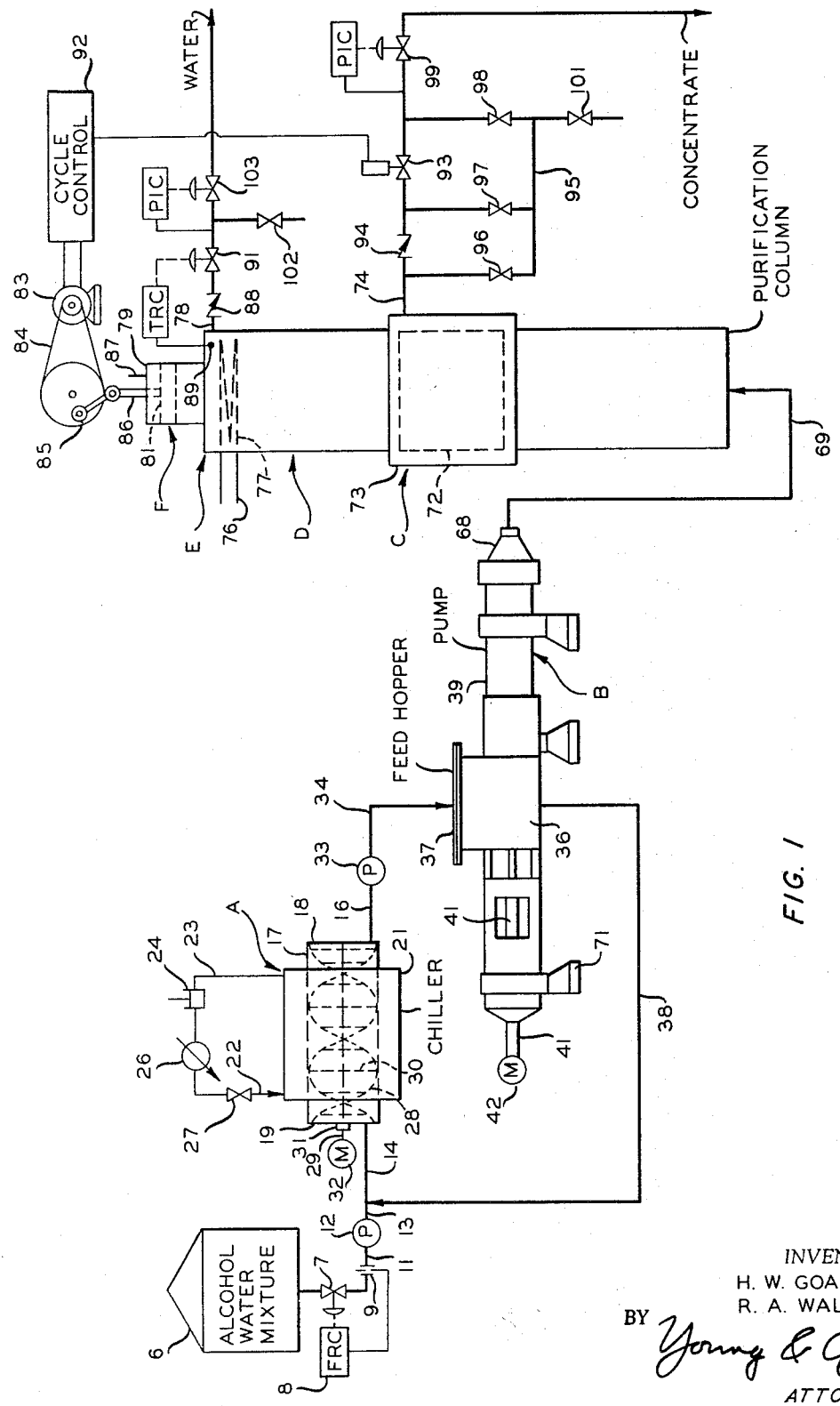

The apparatus of FIGURE 1 comprises freezing or crystallizing chiller means A, a progressing cavity pump B, a filtering means C, reflux zone D, a melting section E, and a pulsation-producing device F.

A liquid feed mixture comprising two or more components, one of which is separable from the mixture by crystallization, enters the apparatus from tank 6 through valve 7, preferably at a constant flow rate, which rate may be set by a flow rate controller ("FRC") 8, which measures the pressure drop across orifice 9 as a function of the flow rate and opens or closes valve 7 to maintain a constant rate of flow. The liquid passing valve 7 in line 11 is forced by means of pump 12 through lines 13 and 14 and chilling means A into line 16. Pump 12 may be omitted if there is sufficient hydraulic head from the elevation of tank 6.

Crystallization section A comprises a cylindrical barrel 17 having closed ends 18 and 19, said barrel being in indirect heat exchange with a cooling jacket 21 having inlet 22 and outlet 23. Refrigeration fluid vapor (such as vapors of carbon dioxide, sulfur dioxide or propane, or the like) from outlet 23 is compressed in compressor 24, cooled and condensed to liquid in condenser 26, and is expanded and vaporized through valve 27 to return through line 22 to refrigerate jacket 21. Positioned within the crystallization barrel 17 is an agitating or scraping means 28, which is designed to prevent the accumulation of solid material on the heat exchange surface of 17. Scrapers 28 may be suitably constructed of strips of metal or other suitable materials known in the art. They can be fabricated in the form of a helix, as indicated in the drawing, or can be straight. Any suitable number of scrapers 28 can be provided. They are mounted on a rotatable shaft 29 by means of radial members 30. Shaft 29 is axially positioned in shell 17 and is connected to any suitable source of power for rotating the scrapers, such as motor 32. This apparatus is operative regardless of which direction the shaft 29 rotates, although when blades 28 are helical it is preferred to rotate them so as to tend to move crystals toward pipe 16, but it will still operate when rotated in the opposite direction. Shaft 29 is suitably sealed in end member 19 by means of a packing gland 31 of any desired type known in the art. Suitable cooling of the feed which enters shell 17 can be provided by adding a coolant through inlet 22 and withdrawing the coolant through outlet 23. Sufficient cooling in section A is provided so that a predetermined amount of solid crystals is produced, as subsequently discussed herein. The resulting crystal slurry passes through line 16, pump 33 and pipe 34 into feed hopper 36 through a connection in the top of lid 37 of progressing cavity pump B. Pump 33 can be any pump that can handle slurries, preferably a centrifugal pump, and need not be located in lines 16, 34, but can be placed in line 38 instead, or in line 14 instead, as this pump is to enable recycle of slurry or melted slurry through line 38 and 14 to freezing chiller A.

Figure 2:
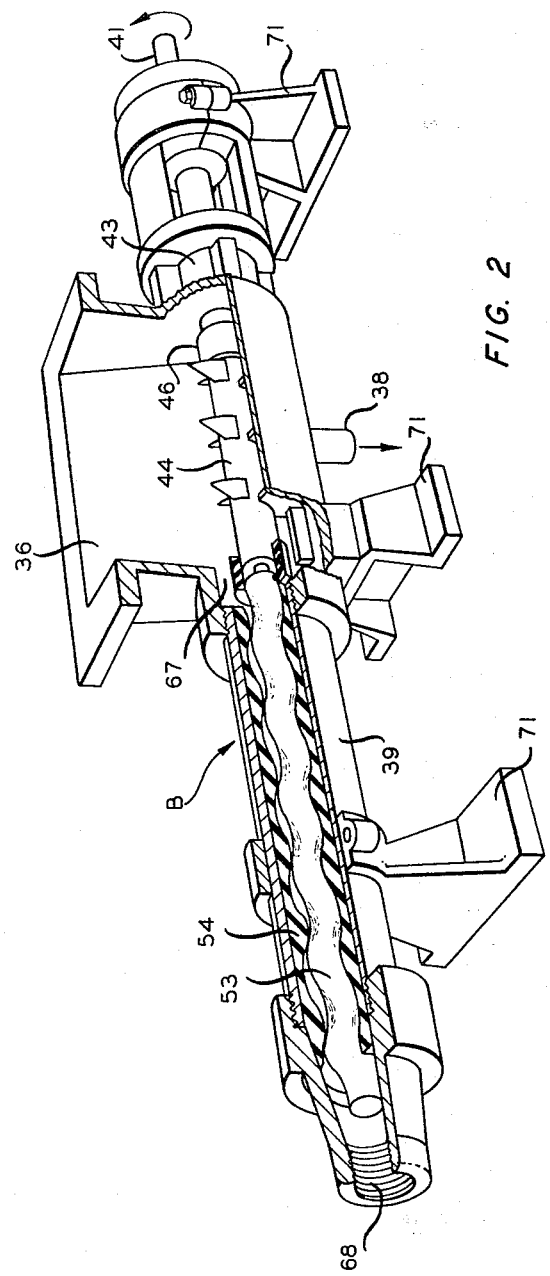
Figure 4:
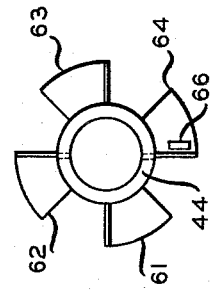
FIGURE 4 is an end view of the auger of FIGURE 3 with the rubber universal joint sleeve and universal joint pins removed.
Figure 3:
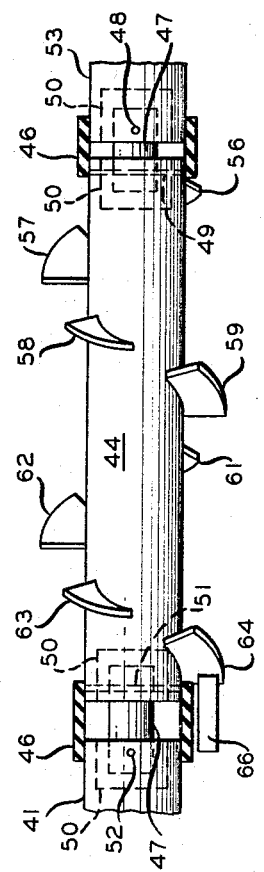
FIGURE 3 is an enlarged elevational view of the pitched-paddle, auger feed shaft of FIGURE 2, with some parts broken away.

Progressive cavity pump B is shown in greater detail in FIGURE 2 and comprises a feed hopper 36, a recycle line 38 and a pump barrel 39 secured in communication therewith, and a rotating shaft 41. Shaft 41 is rotated by motor 42 in the direction indicated and passes through a conventional stuffing box 43 into feed hopper 36, where it is connected to auger feed rod 44 by a universal joint covered by rubber sleeve 46. The universal joints are shown in detail in FIGURE 3 and comprise smaller concentric shafts 47 and pins 48, 49, 51 and 52. Pin 48 connects helical rotor 53 with shaft 47 pivotally in one plane inside a cavity 50 inside rotor 53 and pin 49 connects shaft 47 with auger shaft 44 pivotally in a plane at right angles to pin 48 inside cavity 50 in shaft 44, and the pin 51 connects shafts 44 and 47 and pin 52 connects shafts 47 and 41 in a similar manner inside similar cavities 50. These universal joints are desirable, as rotor 53 tends to thresh around in helical stator 54 which is mounted stationary in pump barrel 39.

Auger shaft 44 could be provided with one or more solid helical fins (not shown), but for moving an ice slurry it is preferable to provide shaft 44 with a more or less helical flight or flights of pitched paddles 56–64. The last paddle downstream, 64, is further provided with an anti-bridging bar 66 which extends over the universal joint cover 46 to keep ice from packing out from the slurry in the throat 67 of stator 54. The rotation of shaft 41 in the direction indicated causes pitched paddles 56–64 to move ice crystals from hopper 36 into throat 67 and stator 54, and causes rotor 53 with the cooperation of stator 54 to form cavities containing these ice crystals, which cavities move progressively to the outlet 68, connected to line 69 and to the filter zone C. The pump B may be provided with legs 71 if desired.

Filtration section C in FIGURE 1 comprises a suitable filter medium 72 and an external shell 73, the latter being provided with an outlet pipe 74 for filtrate. Filter medium 72 can be of any desired type known in the art. For example, it can comprise a metallic screen, a sintered perforate metal member or a perforate metal member supporting a filter cloth. In any event, it is desirable that the filter member 72 be positioned integrally with respect to the shell 73.

Filtrate produced in filter zone C is removed from the system through outlet 74.

The remaining crystal mass passes through reflux zone D wherein it is countercurrently contacted with liquid reflux produced as subsequently described.

As the crystal mass approaches heater 76 in melting section E, the crystals are melted. Heater 76 can be in the form of an electrical heater (not shown) or a heat transfer coil 77 through which a suitably heated fluid is pumped. Part of the melt produced by heater 76 is withdrawn through outlet pipe 78 as a purified product of the process. The remainder of the melt is forced back through reflux zone D to form reflux which effects crystal purification, the resulting liquid being drawn off through outlet 74, together with the filtrate. Although an internal heater 77 is shown, an external heater (not shown), for example, a heating jacket encompassing section E and provided with means for circulating a heating fluid therethrough, can be used if desired.

The pulsation-producing F comprises a cylinder 79 which is suitably attached to section E as, for example, by welding, together with a reciprocatable piston 81. Reciprocation of piston 81 is produced, for example, by an electric motor 83, a belt 84, a crank means 85, and connecting rod 86, which can be sealed in the top of cylinder 79 by means of a packing gland (not shown). An outlet 87 is provided in the top of cylinder 79 to facilitate the reciprocation of piston 81 and can be connected to means (not shown) for recovery of any material which might escape from column D in case of failure of piston 81, which may be provided with conventional piston rings (not shown) to reduce leakage past it.

While the crystal mass is being advanced from chilling section A through pump B, filtration section C, reflux section D and melting section E, piston 81 is reciprocated at a suitable rate, which is subsequently discussed herein, so that a pulsating pressure is exerted on the melt reflux which is intermittently forced back, countercurrently with respect to the crystal mass, through reflux zone D. In melt outlet 78 is positioned a check valve 88 to prevent the back flow of withdrawn melt into the crystal purification column. A temperature recorder-controller, designated in the drawing as TRC, is provided and is connected to a suitable temperature-sensitive device, such as a thermocouple indicated by the numeral 89. The thermocouple is preferably positioned within the purification column at a point adjacent heater 77. The temperature recorder-controller is also operatively connected to a motor valve 91. The temperature recorder-controller is of any suitable design known in the art and can suitably comprise a device of known design for converting the electrical effect produced by thermocouple 89 to an air pressure which is utilized to open or close valve 91. The temperature recorder-controller is suitably so adjusted that an undesirably rapid advance of crystals through reflux zone D results in a predetermined low temperature which is measured by thermocouple 89, which operates through the temperature recorder-controller to throttle valve 91 and decrease the rate of withdrawal of melt. An undesirably slow advance of crystals through the purification column produces the opposite effect. The described combination of apparatus and the method for controlling melt withdrawal rate is disclosed and claimed in application Ser. No. 514,499 filed June 10, 1955, by J. D. Ratje, now U.S. Patent 2,919,991 patented Jan. 5, 1960, assigned to Phillips Petroleum Company.

It has been found that the invention operates well with pulsations of pressure applied to the purification zone D including filter zone C and melting zone E, but not to the freezing zone A, of the magnitude of a differential in pressure during the pulses of 50 to 200 p.s.i., preferably from 75 to 150 p.s.i., and a frequency of 100 to 500 pulse cycles per minute, preferably 200 to 400 per minute. The progressive cavity pump B acts to completely block the pulses out of the freezing zone A by reflecting them back into the filter zone C, thus augmenting their effect in purification or reflux zone D where the pulses do the most good.

While cylinder 79 of pulse-producing member F is shown connected to melting section E, where it will do the most good, the invention will still operate with cylinder 79 connected to any part of zones C, D and E, including any pipes connected thereto, such as pipe 69, 74 or 78.

Also shown in the drawing is a cycle control device 92, of known design, which is operatively connected with motor 83 so that an electrical pulse is produced in synchronism with piston 81. The cycle control 92 can be so adjusted that on the compression stroke of piston 81 an otherwise closed solenoid valve 93 is opened, resulting in the removal of filtrate from the purification column only on the compression stroke of piston 81. Also provided, to aid in accomplishing this effect, is check valve 94 in filtrate withdrawal line 74. A similar arrangement (not shown) can be effected in connection with the withdrawal of melt through outlet 78. However, it is preferred, in such a case, that the melt withdrawal cease during the compression stroke of the piston. Cycle control means 92 can, for example, be alternatively operatively connected to crank 85 or connecting rods 86 (not shown). It can include an electrical make-and-break device, such devices being well known in the art.

It has been found that although the described synchronism of withdrawal with the compression stroke of the piston 81 produces satisfactory results, it is not necessary for obtaining the benefits of this invention. A suitable and often preferred arrangement is to utilize by-pass 95, solenoid valve 93 and/or check valve 94 being closed and by-possed by opening two or more of valves 96, 97, 98 and 101. In this mode of operation, it is desirable to utilize a predetermined back-pressure on the liquid being withdrawn through outlet 74. This back-pressure is to be distinguished from that intermittently applied by the piston within the column. The filtrate or mother liquor back-pressure is an external back-pressure and can be constant; it need not be intermittent. For the purpose of controlling filtrate back-pressure, a pressure indicator-controller designated as PIC in line 74 can be utilized by closing valve 101. This instrument is of a type well known in the art and converts a back-pressure in the liquid withdrawal line 74 to an air pressure, which suitably throttles motor valve 99 to maintain a desired back-pressure in line 74. A similar instrument arrangement can be utilized in connection with valve 103 in melt withdrawal line 78 by closing valve 102. The foregoing external back-pressure control is disclosed and claimed in application Ser. No. 514,499, filed June 10, 1955, by J. D. Ratje.

It is also within the scope of this invention to withdraw melt through outlet 78 at a constant rate (not shown), utilizing metering equipment known in the art.

The alcohol-water mixture to be separated or concentrated may be stored in tank 6 and admitted to the system through valve 7. Tank 6 can be a large vat of beer or wine to be concentrated, and the water removed comes out line 78 and the concentrated beer or wine with a higher alcohol content comes out line 74.

While certain process steps and apparatus have been described for illustrative purposes, it is believed clear that the present invention is not limited thereto.

Having described our invention, we claim:

1. A process for separately recovering a concentrated solution of a first liquid and a concentrated solution of a second liquid from a first solution of said first liquid in said second liquid comprising the steps of:
   freezing crystals containing said second liquid in greater proportion than said first liquid in said first solution in a freezing zone to form a first crystal slurry;
   positively pumping said slurry in progressing cavities into a crystal purification zone without allowing any back flow into said freezing zone;
   filtering a controlled amount of said concentrated solution of said first liquid from said slurry in said purification zone while forcing said crystals into a crystal melting zone;
   withdrawing a controlled amount of said concentrated solution of said second liquid from said melting zone; and
   thereby refluxing the remaining amount of said concentrated solution of said second liquid from said melting zone into said purification zone to wash said crystals and thereby concentrate the proportion of said second liquid in said crystals as they approach said melting zone.

2. The process of claim 1 in which some of said first crystal slurry from said freezing zone is recycled thereto to increase the fluid velocity and turbulence therein.

3. The process of claim 1 in which a pulsating pressure is applied to the slurry in the purification zone but not to the freezing zone.

4. The process of claim 2 in which a pulsating pressure is applied to the slurry in the purification zone but not to the freezing zone.

5. The process of claim 3 in which the pulsating pressure differential is from 50 to 200 p.s.i. and the frequency of the pulses is from 100 to 500 cycles per minute.

6. The process of claim 4 in which the pulsating pressure differential is from 50 to 200 p.s.i. and the frequency of the pulses is from 100 to 500 cycles per minute.

7. Apparatus for separately recovering a concentrated solution of a first liquid and a concentrated solution of a second liquid from a first solution of said first liquid in said second liquid comprising in combination:
   means for forming a first crystal slurry containing crystals containing said second liquid in greater proportion than said first liquid comprising a scraped surface chiller having an inlet and an outlet;
   a crystal purification column comprising a chamber having an inlet for said first crystal slurry adajcent one end, a first restricted liquid outlet for said concentrated solution of said second liquid adjacent the other end, a second restricted liquid outlet for said concentrated solution of said first liquid in its wall between said inlet and first outlet, a filter screen of proper size disposed and adapted to prevent said crystals from entering said second outlet, pressure pulsation producing means comprising a cylinder having a reciprocating piston closing the end thereof connected in communication with said chamber, and a crystal melting means between said first outlet and said filter screen;
   means to recycle some of said first crystal slurry from the inlet to the outlet of said first crystal slurry forming means; and
   a positive-displacement progressing cavity pump having an inlet connected to said outlet of said first crystal slurry forming means and an outlet connected to said inlet of said crystal purification column.

8. Apparatus for separately recovering a concentrated solution of a first liquid and a concentrated solution of a second liquid from a first solution of said first liquid in said second liquid comprising in combination:
   means for forming a first crystal slurry containing crystals containing said second liquid in greater proportion than said first liquid comprising a scraped surface chiller having an inlet and an outlet;
   a crystal purification column comprising a chamber having an inlet for said first crystal slurry adjacent one end, a first restricted liquid outlet for said concentrated solution of said second liquid adjacent the other end, a second restricted liquid outlet for said concentrated solution of said first liquid in its wall between said inlet and first outlet, a filter screen of proper size disposed and adapted to prevent said crystals from entering said second outlet, pressure pulsation producing means comprising a cylinder having a reciprocating piston closing the end thereof connected in communication with said chamber, and a crystal melting means between said first outlet and said filter screen; and
   a positive-displacement progressing cavity pump having an inlet connected to said outlet of said first crystal slurry forming means and an outlet connected to said inlet of said crystal purification column.

9. Apparatus for separately recovering a concentrated solution of a first liquid and a concentrated solution of a second liquid from a first solution of said first liquid in said second liquid comprising in combination:

means for forming a first crystal slurry containing crystals containing said second liquid in greater proportion than said first liquid comprising a scraped surface chiller having an inlet and an outlet;

a crystal purification column comprising a chamber having an inlet for said first crystal slurry adjacent one end, a first restricted liquid outlet for said concentrated solution of said second liquid adjacent the other end, a second restricted liquid outlet for said concentrated solution of said first liquid in its wall between said inlet and first outlet, a filter screen of proper size disposed and adapted to prevent said crystals from entering said second outlet, and a crystal melting means between said first outlet and said filter screen;

means to recycle some of said first crystal slurry from the inlet to the outlet of said first crystal slurry forming means; and a positive-displacement progressing cavity pump having an inlet connected to said outlet of said first crystal slurry forming means and an outlet connected to said inlet of said crystal purification column.

10. Apparatus for separately recovering a concentrated solution of a first liquid and a concentrated solution of a second liquid from a first solution of said first liquid in said second liquid comprising in combination:

means for forming a first crystal slurry containing crystals containing said second liquid in greater proportion than said first liquid having an inlet and an outlet;

a crystal purification column comprising a chamber having an inlet for said first crystal slurry adjacent one end, a first restricted liquid outlet for said concentrated solution of said second liquid adjacent the other end, a second restricted liquid outlet for said concentrated solution of said first liquid in its wall between said inlet and first outlet, a filter screen of proper size disposed and adapted to prevent said crystals from entering said second outlet, pressure pulsation producing means and a crystal melting means between said first outlet and said filter screen;

means to recycle some of said first crystal slurry from the inlet to the outlet of said first crystal slurry forming means; and a positive-displacement progressing cavity pump having an inlet connected to said outlet of said first crystal slurry forming means and an outlet connected to said inlet of said crystal purification column.

11. Apparatus for separately recovering a concentrated solution of a first liquid and a concentrated solution of a second liquid from a first solution of said first liquid in said second liquid comprising in combination:

means for forming a first crystal slurry containing crystals containing said second liquid in greater proportion than said first liquid comprising a scraped surface chiller having an inlet and an outlet;

a crystal purification column comprising a chamber having an inlet for said first crystal slurry adjacent one end, a first restricted liquid outlet for said concentrated solution of said second liquid adjacent the other end, a second restricted liquid outlet for said concentrated solution of said first liquid in its wall between said inlet and first outlet, a filter screen of proper size disposed and adapted to prevent said crystals from entering said second outlet, and a crystal melting means between said first outlet and said filter screen; and a positive-displacement progressing cavity pump having an inlet connected to said outlet of said first crystal slurry forming means and an outlet connected to said inlet of said crystal purification column.

12. Apparatus for separately recovering a concentrated solution of a first liquid and a concentrated solution of a second liquid from a first solution of said first liquid in said second liquid comprising in combination:

means for forming a first crystal slurry containing crystals containing said second liquid in greater proportion than said first liquid having an inlet and an outlet;

a crystal purification column comprising a chamber having an inlet for said first crystal slurry adjacent one end, a first restricted liquid outlet for said concentrated solution of said second liquid adjacent the other end, a second restricted liquid outlet for said concentrated solution of said first liquid in its wall between said inlet and first outlet, a filter screen of proper size disposed and adapted to prevent said crystals from entering said second outlet, and a crystal melting means between said first outlet and said filter screen; and a positive-displacement progressing cavity pump having an inlet connected to said outlet of said first crystal slurry forming means and an outlet connected to said inlet of said crystal purification column.

References Cited

UNITED STATES PATENTS

| | | | |
|---|---|---|---|
| 2,683,178 | 7/1954 | Findlay | 62—58 |
| 2,815,288 | 12/1957 | McKay | 62—58 |
| 3,017,751 | 1/1962 | Hawkins | 62—58 |
| 3,017,752 | 1/1962 | Findlay | 62—123 |

NORMAN YUDKOFF, *Primary Examiner.*

G. HINES, *Assistant Examiner.*